July 25, 1933. A. H. SHOEMAKER 1,919,911
PNEUMATIC TIRE AND RIM CONSTRUCTION
Filed Sept. 17, 1930
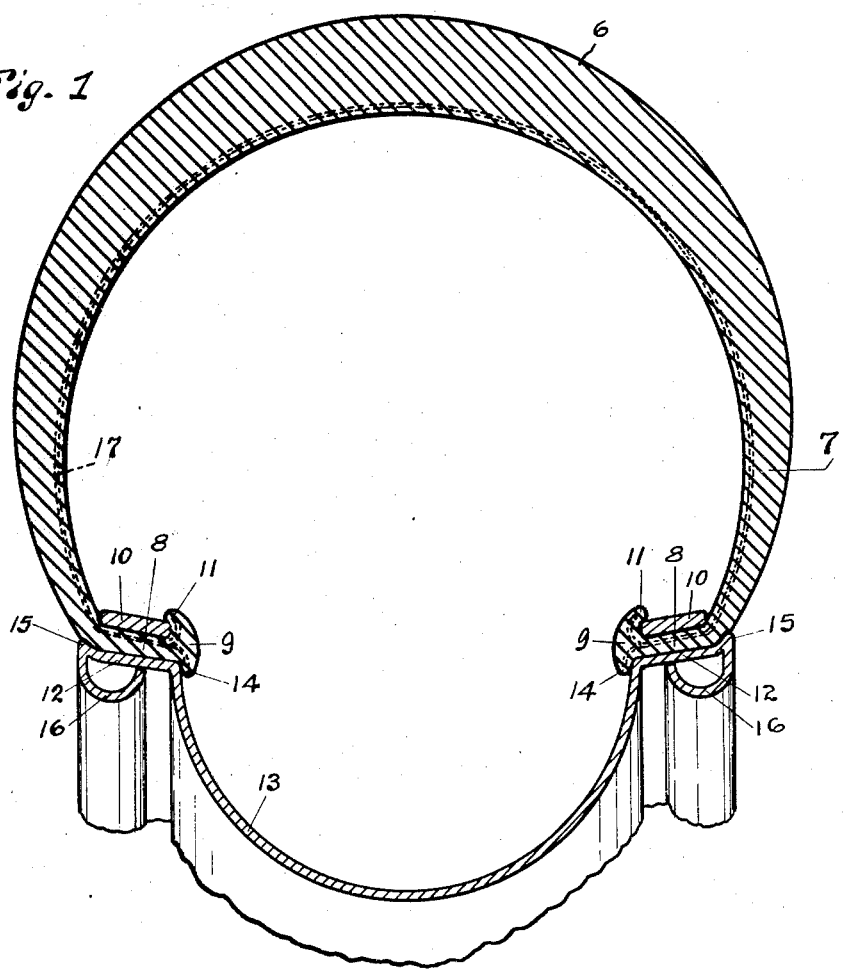
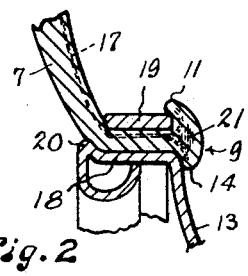
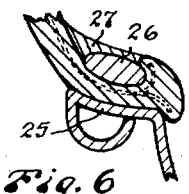
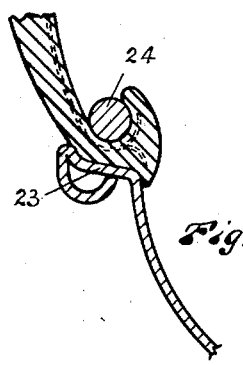
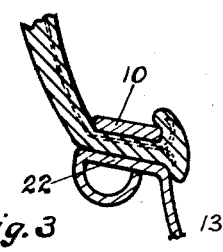
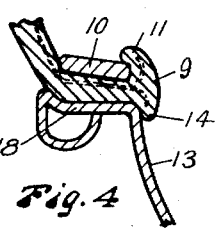
INVENTOR
Alvin H. Shoemaker
BY
Fred C. Matheny
ATTORNEY Patented July 25, 1933

1,919,911

UNITED STATES PATENT OFFICE

ALVIN H. SHOEMAKER, OF SEATTLE, WASHINGTON

PNEUMATIC TIRE AND RIM CONSTRUCTION

Application filed September 17, 1930. Serial No. 482,461.

My invention relates to improvements in pneumatic tires and rims of the type disclosed in my prior applications Serial No. 357,875, filed April 24, 1929, and Serial No. 480,665 filed Sept. 9, 1930. In both of the above mentioned prior applications I disclose a tire in which the usual non-elastic bead is left out when the tire is molded or vulcanized. In the first mentioned prior application this bead is applied permanently to the tire after the tire has been taken out of the molds. In the last mentioned prior application the tire is marketed without any non-elastic bead therein and is attached to a specially constructed rim by means of external split locking rings which constitute a part of the rim and always accompany the rim, the bead portions of the tire being drawn around the outside of the rim in that form of construction.

In my present application I provide a tire which is manufactured and marketed without any non-elastic bead therein and in which a non-elastic bead in the form of an annular retaining ring is inserted within the bead portions of the tire at the time the tire is applied to the rim, said retaining ring accompanying the rim instead of the tire and being adapted to reduce the diameter of said tire and to bind the tire securely to the rim.

In the manufacture of the tires, if the usual non-elastic or substantially non-elastic bead rings are left out of the bead portions of the tire at the time the tire is molded the process of manufacture is greatly simplified and the cost of production is very much reduced and the tires are left with relatively flexible bead portions instead of with stiff bead portions thus making the tires easier and less bulky and less cumbersome to handle in marketing. It is a primary object of my present invention to provide a tire in which the bead portions are left flexible and pliable and in which the non-elastic bead rings are detachable relative to the tire and need not be applied to the tire until such time as the tire is placed on a rim.

It is a further primary object of my invention to provide a tire of this nature in which the bead portions of the tire will be drawn very tightly into engagement with the rim when the tire is inflated to thereby form an air seal with the rim thus making it possible, where an air tight rim is used, to dispense with the usual inner tube.

It is a further primary object of my invention to provide a tire of this nature which may be reduced in diameter by the insertion of the detachable non-elastic bead ring and then held to this reduced diameter while in service by said detachable non-elastic bead ring thereby placing the peripheral tread portion of the tire under compression and increasing the wearing qualities of the tire. When the tread rubber is thus compressed the density of this rubber is increased and external cuts in such rubber will tend to close up instead of opening up, as they will do when the rubber is under tension, thus making a tire which is more resistant to puncture and more self sealing in case it becomes cut or punctured.

While it is not absolutely essential to this invention to reduce the diameter of the tire as above set forth I prefer to do so to increase the wearing qualities of the tire and my preferred method of producing these tires is to construct the tires oversize and after they have been put through the vulcanizing or molding process and preferably at the time they are applied to the rim to reduce the size of the tire by drawing in on the same at the location of the beads thus putting the rubber or elastic material of the tire under compression or increasing the density of the same. The degree to which the density is increased will depend on the amount the tire is reduced in diameter, it being preferable to increase the density enough to leave the rubber under compression when the tire is inflated but it being possible to increase the density only enough to offset or partially offset the stretching due to inflation when the tire is put into service.

The usual tire has a normal and natural density when not inflated and is stretched by inflation so that a cut made in the outer wall of the same will tend to open up. In my present tire the rubber may actually be in a compressed state after the tire is applied and inflated so that any cut or puncture will tend to close up and remain closed and the wearing qualities of the tire increased, it being evident that rubber in a compressed state will have greater wearing qualities than the same rubber will when used under tension or in a stretched condition.

Other and more specific objects of my invention will be apparent from the following description taken in connection with the accompanying drawing.

In the drawing Figure 1, is a cross section of a tire and rim constructed in accordance with my invention parts being shown in elevation.

Figs. 2, 3, 4, 5 and 6 are fragmentary sectional views of slightly modified forms of said tire and rim showing one side of the tire and rim only.

Like reference numerals designate like parts throughout the several views.

Referring to Fig. 1, I show a pneumatic tire embodying a tread portion 6 and two oppositely disposed side walls 7 each terminating in a relatively flexible edge portion 8 having an enlargement or bead 9 of flexible material formed thereon. Each edge portion 8 is relatively thin and is adapted to have a non-elastic annular detachable bead ring 10 placed therein. The inner edge of the bead ring 10 rests against an inwardly extending flange portion 11 of the bead portion 9 and the edge portion 8 of the tire draws outwardly around the outer edge of said detachable bead ring. The outer surface of the flexible edge portion 8 is seated on a relatively flat bead receiving portion 12 of a rim 13. The rim 13 is preferably a deep channelled air tight rim and is so illustrated in the drawing although it will be understood that any rim which has the bead receiving portions 12 and is externally channeled enough to facilitate application of the tire may be used. The bead portion 9 has an air seal flange 14 which overlaps the edge of the rim at the inner extremity of the bead receiving portion 12 so as to be drawn very tightly against the rim and cooperate with the rim to form an air seal. Each bead receiving portion 12 is curved outward slightly at its outer edge as at 15 to afford a slight raise against which the outer base portion of the tire may press, said raised portion 15 serving as a positioning means for the tire and the bead ring and further serving as a weather seal to help exclude moisture and dirt. When the rim is made of sheet metal the outer edge of the same beyond the raised portion 15 may be bent inwardly as at 16.

In Fig. 1, I have shown the bead receiving portions of the rim as of slightly inclined or expanding shape from inside to outside and have shown the non-elastic bead rings 10 as having a slightly greater inclination. The incline of the bead receiving portions 12 causes the bead rings 10 to tighten thereon very firmly and grip the portions 8 of the tire very securely, and, due to the difference in inclination of these two parts, the tire portions 8 will be gripped most tightly adjacent the bead portions 9. The tire may be reinforced, as by cords 17 which preferably extend radially of the tire but do not extend diagonally nor longitudinally of the same and these cords extend through the portions 8 and into the bead portions 9 so that when the tire is inflated the internal air pressure will have a tendency to draw the portions 8 outwardly and will draw the bead portions 9 outwardly and the air seal flanges 14 will be drawn very firmly into contact with the rim thereby preventing leakage of air when no tube is used. To prevent leakage when no inner tube is used it is essential that all reinforcing cords and the like be fully covered by rubber.

In Fig. 2, I show a modified form of the invention in which the bead receiving portions 18 and the non-elastic bead rings 19 are not tapered nor inclined but are both cylindrical, except that the outer edge of the bead receiving portions 18 are each provided with an outwardly curved portion 20 corresponding to the previously described portion 15. In this form of the invention a ring 21 of rubber which is flexible and elastic but is more solid than the surrounding rubber is embedded in each bead portion to offer greater resistance to the forces which tend to draw the bead portions outwardly between the bead receiving rim portions 18 and the non-elastic bead rings 19.

In the alternative construction shown in Fig. 3 the bead receiving rim portion 22 and non-elastic bead ring 10 are both tapered or coned the same amount in the same direction and the out turned portion at the outer edge of the bead receiving portion of the rim is omitted.

In Fig. 4, the bead receiving portion 18 of the rim is cylindrical as in Fig. 4 and a tapered non-elastic bead ring 10 as shown in Figs. 1 and 3 is used.

In Fig. 5, the bead receiving portion 23 of the rim is narrower but is otherwise similar to the bead receiving portion shown in Fig. 1 and a non-elastic bead ring 24 of substantially cylindrical cross section is used in the tire.

In Fig. 6, the bead receiving portion 25 of the rim is curved and the non-elastic bead ring 26 is of oval cross sectional shape, and is covered by elastic rubber 27 free from reinforcing.

Many other variations in the shapes of the bead receiving rim portions and the non-elastic bead rings may be used.

With the several forms of my invention herein disclosed it is not difficult for a person of ordinary strength, without employing special tools, to place non-elastic bead rings of smaller diameter than the bead portions of a tire within said bead portions and at the same time reduce the external diameter of the tire and place the rubber in the tread portion of said tire under sufficient compression so that it will remain compressed after the tire is inflated. After the non-elastic bead rings are inserted the tire may be placed on the rim by first dropping peripheral portions of the tire and bead rings into the recessed portion of the rim then passing the diametrically opposite tire and bead ring portions over the rim flanges, then allowing the tire bead portions to spring out and start onto the bead receiving flanges of the rim and then admitting air under pressure to force said tire bead portions outwardly and cause them to seat properly on the rim flanges. When the tires are thus applied and inflated the bead portions of the tires will cooperate with the rims to form an air seal which makes it possible to use the tires without inner tubes.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In a pneumatic tire and rim construction, a rim having inclined annular flanges extending sidewise therefrom and affording conical surfaces whereon the base of a tire may rest, a tire having its transverse curvature on an arc of approximately one hundred eighty degrees said tire being open around the inner side and having radial cord reinforcing leaving said tire free to stretch and compress longitudinally and having inturned edge portions provided with internal grooves and disposed to seat on said rim flanges, a non-elastic bead ring removably disposed within the grooves in each of said inturned edge portions whereby said inturned edge portions are held between said bead ring and said rim flanges, and a bead portion on the inner edge of each of said inturned edge portions, said bead portions being of greater thickness and bulk than the edge portions whereby they will bind firmly against said rim and will resist being drawn between said bead ring and said rim flanges.

2. In tire means of the character described; a one-piece annular pneumatic tire having its transverse curvature on an arc of approximately one hundred eighty degrees; cord reinforcing means extending radially of the tire, elastic tire bead portions at the respective edges of said tire, each of said tire bead portions having an internal annular groove, and a separable non-elastic bead ring of smaller diameter than said groove removable relative to said groove and adapted when disposed within said groove to retain said tire in a circumferentially compressed condition.

3. In a tire and rim means of the character described; a peripherally recessed rim having inclined annular flanges forming tire bead receiving cones extending sidewise from the edges of said rim; relatively shallow raised portions formed at the outer extremities of said flanges; a one-piece annular pneumatic tire having its transverse curvature on an arc of substantially one hundred eighty degrees; cord reinforcing means extending radially of the tire; elastic tire bead portions at the respective edges of said tire, each of said tire bead portions having an internal annular groove, and a separable non-elastic bead ring removably disposed within the groove in each of said tire bead portions said tire bead portions being adapted to seat on said tire bead receiving cones, said shallow raised portions at the outer extremities of said rim flanges affording an obstruction for engagement by the outer portions of the tire beads, the external diameter of said shallow raised portions being less than the internal diameter of said non-elastic bead rings.

ALVIN H. SHOEMAKER.